(12) United States Patent
Loriot

(10) Patent No.: US 10,307,907 B2
(45) Date of Patent: Jun. 4, 2019

(54) MOVEMENT TRANSMISSION DEVICE, IN PARTICULAR A ROBOT ARM

(71) Applicant: MIP ROBOTICS, Paris (FR)

(72) Inventor: Franck Olivier Loriot, Paris (FR)

(73) Assignee: MIP ROBOTICS, Paris (FR)

( * ) Notice: Subject to any disclaimer, the term of this patent is extended or adjusted under 35 U.S.C. 154(b) by 54 days.

(21) Appl. No.: 15/558,600

(22) PCT Filed: Mar. 14, 2016

(86) PCT No.: PCT/FR2016/050562
§ 371 (c)(1),
(2) Date: Sep. 15, 2017

(87) PCT Pub. No.: WO2016/146927
PCT Pub. Date: Sep. 22, 2016

(65) Prior Publication Data
US 2018/0079072 A1    Mar. 22, 2018

(30) Foreign Application Priority Data

Mar. 16, 2015 (FR) ...................... 15 00512
Oct. 6, 2015 (FR) ...................... 15 70050

(51) Int. Cl.
*F16H 55/08* (2006.01)
*F16H 55/10* (2006.01)
(Continued)

(52) U.S. Cl.
CPC .............. *B25J 9/102* (2013.01); *F16H 27/04* (2013.01); *F16H 29/12* (2013.01); *F16H 25/06* (2013.01); *F16H 27/08* (2013.01)

(58) Field of Classification Search
CPC .......... B25J 9/102; F16H 27/04; F16H 27/08; F16H 25/06; F16H 29/12
See application file for complete search history.

(56) References Cited

U.S. PATENT DOCUMENTS 3,726,158 A * 4/1973 Brown ...................... F16H 1/32
                                                            474/156
4,699,023 A    10/1987 Bajulaz
(Continued)

FOREIGN PATENT DOCUMENTS

CN          85106692 A    8/1987
DE            213164 C    5/1919
(Continued)

*Primary Examiner* — Jake Cook
(74) *Attorney, Agent, or Firm* — 24IP Law Group USA, PLLC; Timothy Dewitt

(57) ABSTRACT

The device comprises a shaft 4, a notched mobile member—for example a wheel 1—and at least three arms 2.1, 2.2, 2.3 that together transmit movement between the shaft 4 and the mobile member. Each arm is hinged to two eccentric bearings 3, 3' that hold same parallel to said arm, regardless of the rotational angle of the shaft 4 with which they rotate synchronously. Each arm engages with the notches of the wheel 1 during at least a portion of the cyclic motion of same, by means of at least one tooth 7 of the arm, in such a way as to ensure mutual displacement. The bearings 3, 3' are arranged such that at least one of the arms engages with the mobile member, regardless of the rotational angle of the shaft 4. Said device can be used for producing low-clearance speed reducers.

20 Claims, 13 Drawing Sheets

(51) Int. Cl.
*B25J 9/10* (2006.01)
*F16H 27/04* (2006.01)
*F16H 29/12* (2006.01)
F16H 25/06 (2006.01)
F16H 27/08 (2006.01)

(56) References Cited

U.S. PATENT DOCUMENTS

| 5,187,994 A | | 2/1993 | Hirai et al. | |
|---|---|---|---|---|
| 5,351,568 A | | 10/1994 | Feterl | |
| 5,351,572 A | * | 10/1994 | Vortmeyer | B62D 1/181 280/775 |
| 5,582,068 A | * | 12/1996 | Fukui | F16H 19/043 29/564 |

FOREIGN PATENT DOCUMENTS

| EP | 2 740 701 A1 | 6/2014 |
|---|---|---|
| FR | 2833673 A1 | 6/2003 |
| JP | 2000-065158 A | 3/2000 |
| JP | 2000-280125 A | 10/2000 |

* cited by examiner

MOVEMENT TRANSMISSION DEVICE, IN PARTICULAR A ROBOT ARM

The invention relates to a movement transmission device notably for a robot arm.

The reduction ratios between an electric motor and a robot arm are of the order of 1/100—typically 1/50 to 1/200—with a motor speed of 3000 rpm, or 50 rps and the arm 0.5 rps.

Most current robots use reducers of cycloid type having a toothed wheel mounted in a toothed crown and having very similar numbers of teeth, for example 80 teeth and 79 teeth. The crown has internal toothing and the wheel external toothing. To produce a reducer with minimal clearance, which is reversible and resistant to wear, toothings must be made of very hard metal and machined with high precision. The crown having internal toothing is particularly difficult to machine and this involves considerable cost. The high sales price of robots is explained mainly by the cost of reducers, with a standard robot comprising 6 reducers.

Also, U.S. Pat. No. 5,351,568 discloses a speed reducer comprising a crown with internal toothing and four arms mounted inside the crown on the same eccentric lobe of a shaft. The arms are distributed uniformly inside the crown and present at least one tooth at their end on the side opposite the eccentric shaft to cooperate with the toothing of the crown. A respective pivoting lever is articulated on each arm for describing an elliptical cyclic movement to its teeth when the shaft rotates, the lever oscillating angularly and imposing on the arm a cyclic movement during which it changes orientation. During the elliptical cyclic movement, the teeth of the arm engage the toothing of the crown and have it rotate in a given direction, then disengage and retreat backwards and so on. The arms engage the toothing of the crown successively due to being mounted on the same eccentric lobe and their uniform distribution inside the crown. DE 312164 describes a similar device, but in which each arm is guided to slide and pivot relative to a fixed point instead of being guided by a pivoting lever.

The disadvantage of the devices from these two documents is notably that the elliptical cyclic movement of the end of the arms complicates both the definition of the shape of the teeth of the arms and of the crown at their interface and their machining. Further, they also employ a crown with internal toothing.

It is known from EP 155 497 A1 a reducer comprising two crowns provided with notches distributed uniformly over their circumference and a rotor provided with three radial arms and mounted on an eccentric driven by a drive shaft. Each arm comprises pins intended to cooperate successively with the notches of a respective crown, one of the crowns defining a support member for the corresponding pin to drive the other crown to pivot by the corresponding pin, each of the arms changing orientation during the cyclic engagement and disengagement movement of the pairs of pins with the notches of the crowns. Due to the uniform distribution of the arms around the axis of the rotor, the cyclic engagement and disengagement movement of the pairs of pins of each arm with the notches of the crowns is offset relative to those of the other arms. It also provides several three-arm rotors each mounted on another eccentric secured to the drive shaft, the eccentrics being offset angularly relative to each other around the drive shaft. The disadvantage of this device is being particularly complex and costly as it requires two crowns and one or more three-arm rotors. Also, there is considerable friction between the pins and the notches of the crowns, which are harmful. And it is difficult to provide reduced clearance in the transmission of movement.

The aim of the invention is to at least partially alleviate the disadvantages of the prior art. According to one aspect, the aim of the invention is to propose a movement transmission device most frequently in the shape of a reducer—preferably of a ratio higher than 1/50 and reversible providing high precision by way of a small clearance in the transmission of movement, as well as limited friction.

For this, the invention proposes a movement transmission device, comprising:
a shaft mounted for rotation about its longitudinal axis,
a movable member having at least one succession of notches,
at least three arms for transmitting together movement between the shaft and the movable member,
wherein:
each arm is provided with at least one tooth for cooperating with the notches of the movable member,
each arm is articulated on a first bearing eccentric to a first axis about which the bearing is rotatably mounted, the first bearing and the shaft being linked to rotate in synchronism,
the movable member and each arm are guided mechanically so that:
the arm describes a cyclic movement for each revolution of the first bearing on which it is articulated, and
the arm is in engagement with the movable member for at least a part of the cyclic movement by engaging the at least one tooth of the arm with a notch of the movable member so that displacement of the one causes the displacement of the other,
wherein the first bearings are arranged so that there is at least one arm engaged with the movable member whatever the angle of rotation of the shaft and wherein each arm is also articulated on a second bearing eccentric to a second axis about which the second bearing is rotatably mounted to maintain the arm parallel to itself regardless of the angle of rotation of the shaft.

One will understand that for each arm, the first axis and the second axis are parallel and at a distance from each other, the first bearing and the second bearing having the same eccentricity relative to their respective axis of rotation. Because of this, when the shaft rotates, any point of each arm describes a circular trajectory due to the eccentricity of its bearings. The radius of the circular trajectory corresponds to the eccentricity distance from its bearings to their respective axis of rotation. The fact that the trajectory of the at least one tooth of each arm is circular jointly with the constant orientation of the arms advantageously simplifies the shape of the teeth of the arms and of the movable member at their interface and therefore their machining, and provides better precision due to the reduced clearance in transmission of movement, and limited friction.

The first bearings and the second bearings preferably all have the same eccentricity relative to their respective axis of rotation.

The dependent claims define other preferred embodiments of the invention.

Other characteristics and advantages of the invention will emerge from the following description of preferred embodiments of the invention, given by way of examples and in reference to the appended drawing.

FIGS. 1 to 7 illustrate the basic operating principle of the invention in the case of a notched wheel. FIG. 1 represents an arm in the position where its tooth 7 is entirely engaged in a notch of a wheel. FIG. 2 represents the arm in the position where the tooth 7 is entirely disengaged from the notches of a wheel. FIGS. 3 to 7 represent the different positions assumed by the arm in its cyclic movement around the axis of the shaft 4. During movement around the axis of the shaft 4, the tooth 7 of the arm engages progressively in a notch and disengages from the latter.

Figure 9:
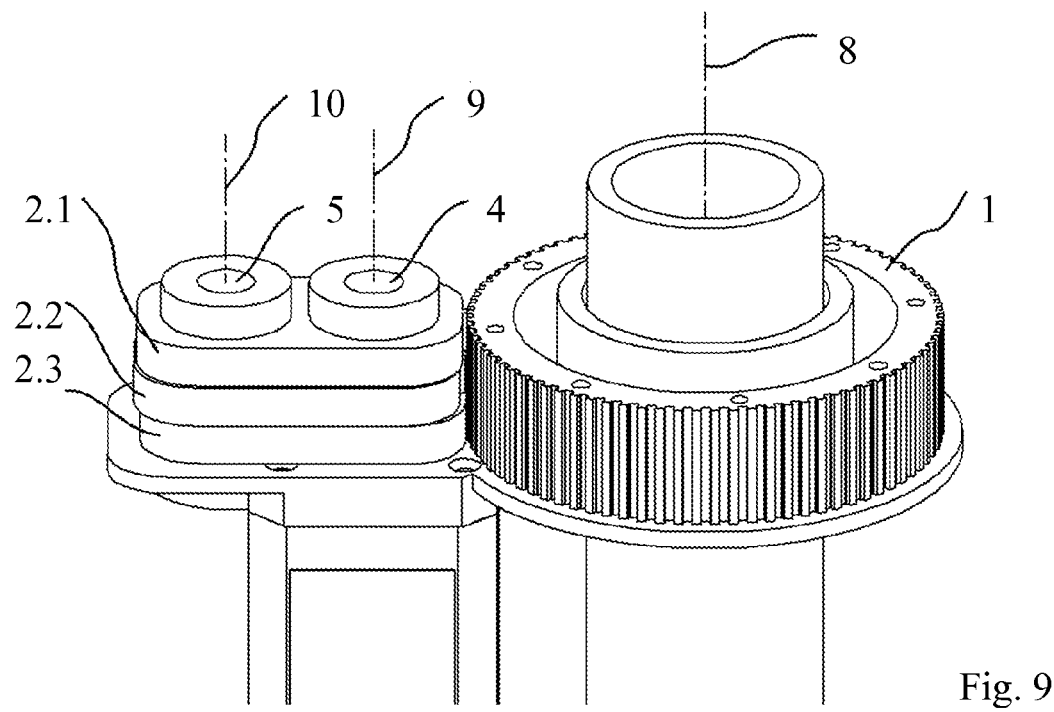
FIG. 9 represents another embodiment with a notched wheel in which the notches are aligned and where by comparison the teeth 7 of the arms 2 are offset relative to each other.
Figure 10:
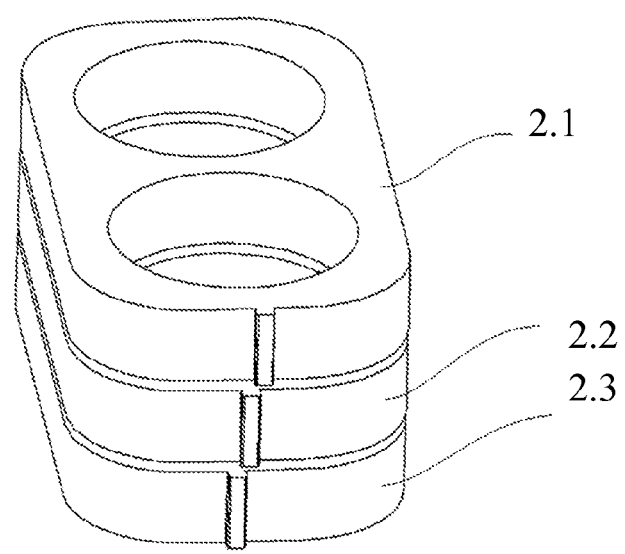

FIG. 10 illustrates the three arms 2 in the case of use with a wheel with aligned notches as that of FIG. 9. The teeth 7 of the arms 2 are offset relative to each other. In this configuration, the axes of the shaft 4 and that of the secondary shaft 5 are in the same plane as the axis of rotation 8 of the wheel 1.

Figure 11:
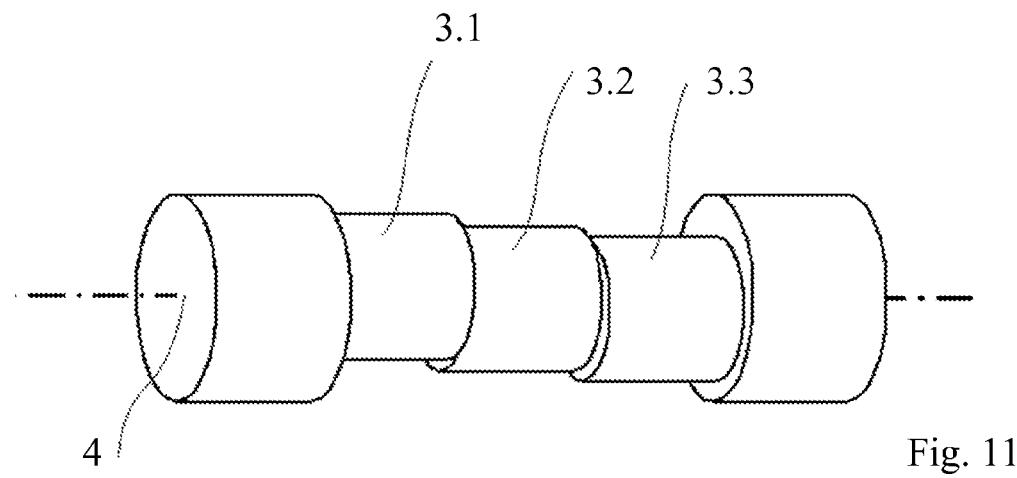

FIG. 11 illustrates the shaft 4 with eccentric bearings 3.1, 3.2, 3.3 (also referenced interchangeably hereinbelow by the reference numeral 3) offset angularly relative to each other.

Figure 12:
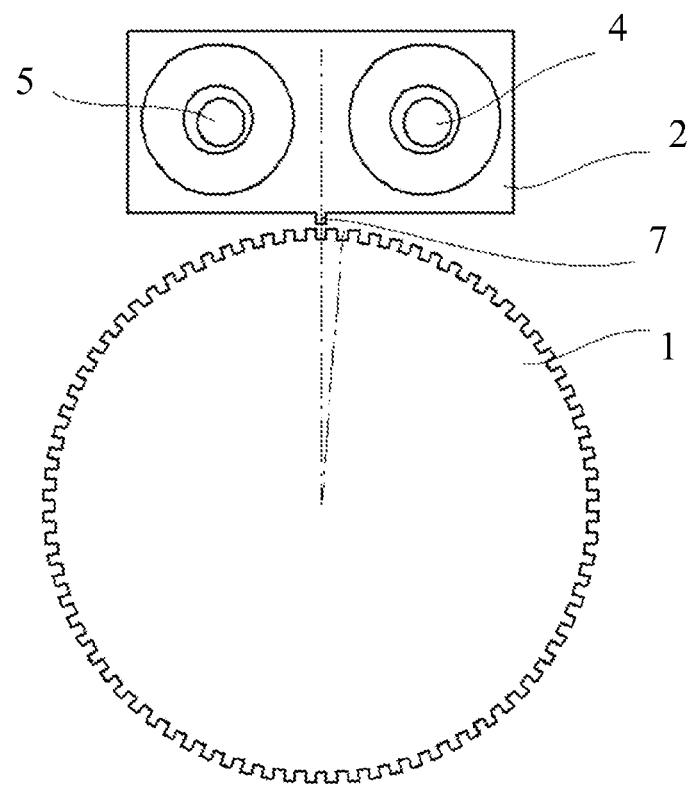

FIG. 12 illustrates a variant to the embodiment of FIG. 9, but in which the tooth 7 of each arm is arranged on another of its sides.

Figure 13:
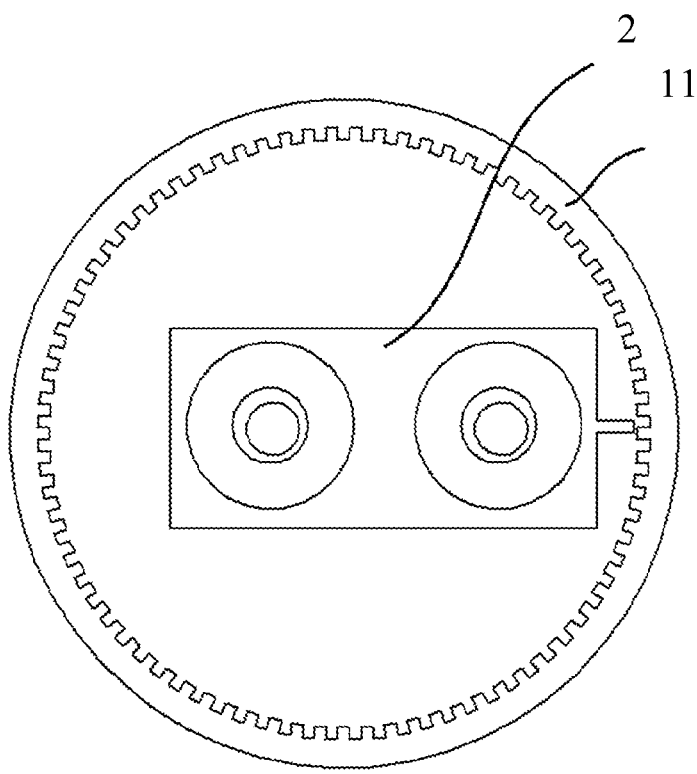

FIG. 13 illustrates an embodiment of the invention with a crown having internal notches.

Figure 14:
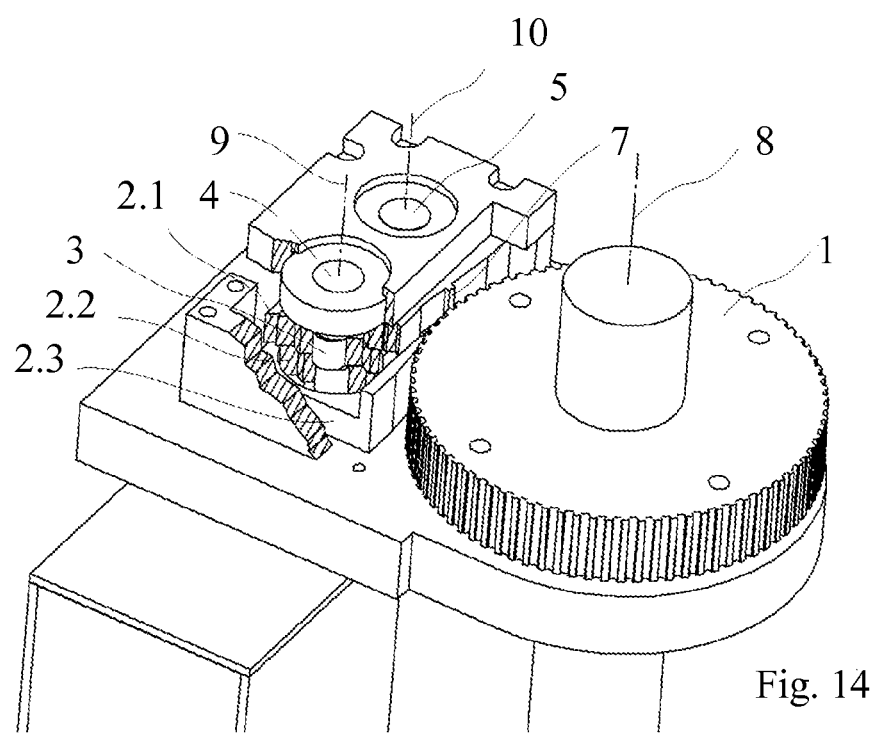
Figure 19:
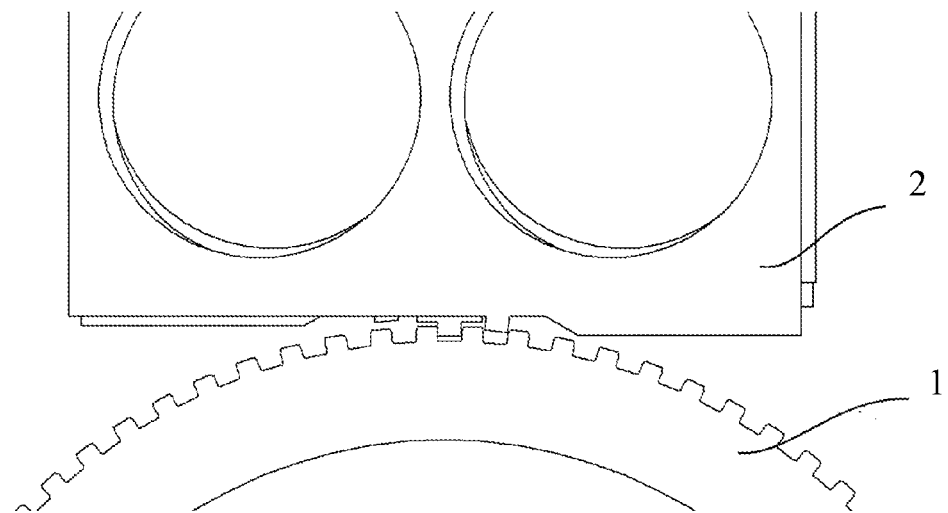

FIG. 14 illustrates an embodiment in which the teeth of the arms will not engage in the same notch of the wheel when the shaft makes a rotation, but in notches adjacent or spaced over the circumference of the wheel, as shown by FIG. 19. This embodiment has the advantage of increasing the contact surface between the faces of the teeth and the faces of the notches and therefore offers the possibility for using a wheel having a slighter thickness while maintaining a substantial contact surface.

FIGS. 15 to 18 illustrate the shape of the pieces in the embodiment illustrated by FIG. 14.

FIG. 19 shows the three teeth facing three contiguous notches of the wheel.

Figure 20:
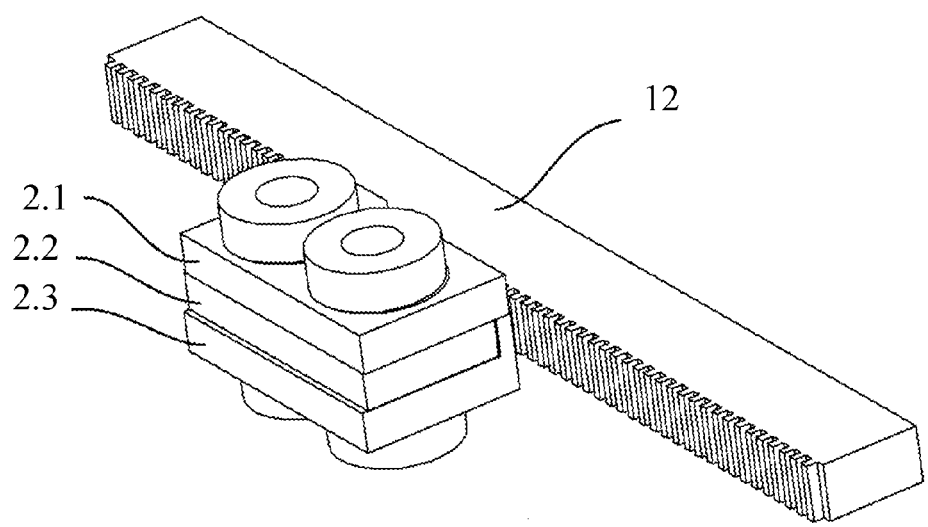

FIG. 20 illustrates an embodiment of the invention with a rack.

Figure 21:
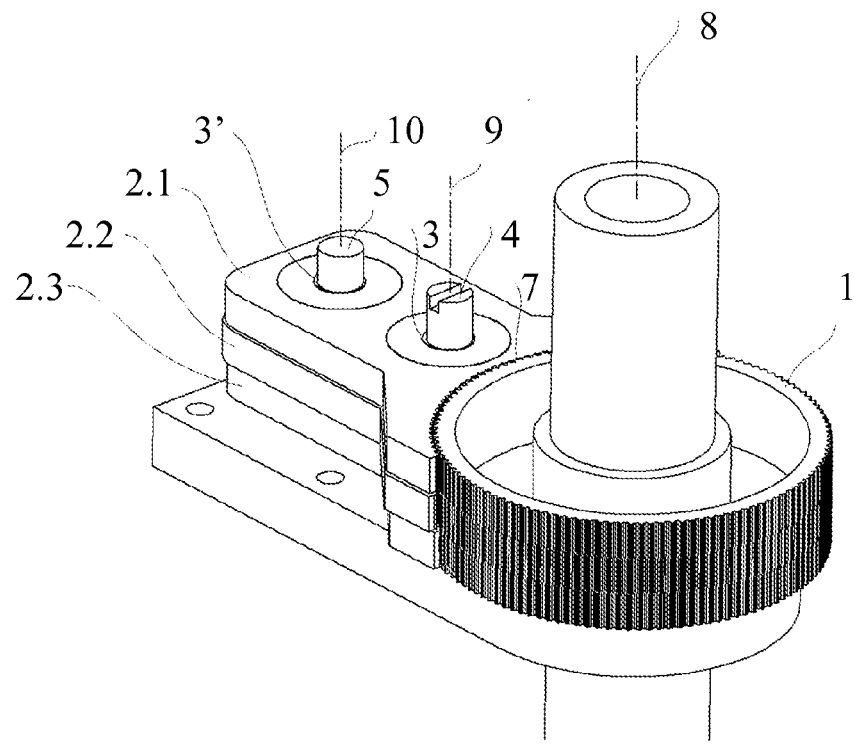

FIG. 21 illustrates an embodiment in which the arms 2.1, 2.2, 2.3 comprise many teeth, here 44 teeth per arm. The high number of teeth on each arm enables greater progressivity of the transmission of movement, since at any time some teeth will be partially engaged in the notches and at least one engaged fully.

Figure 22:
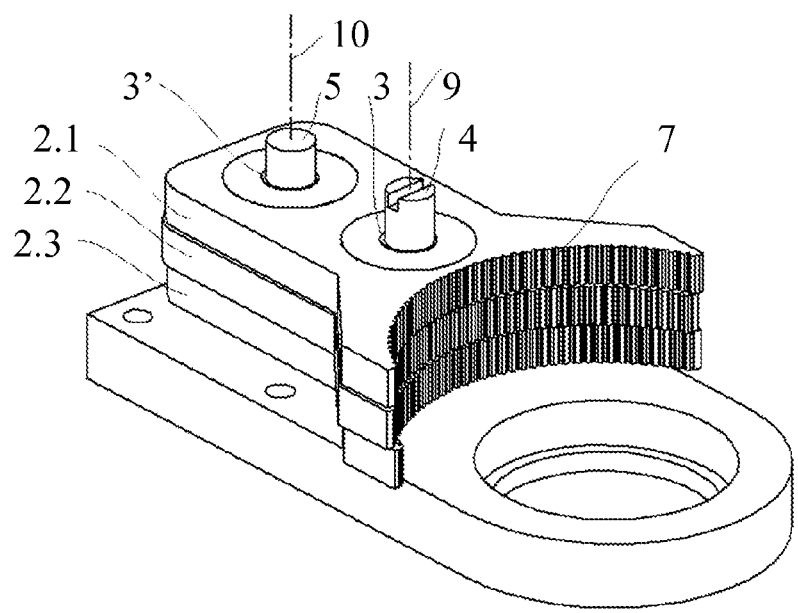

FIG. 22 repeats the embodiment of FIG. 21 by hiding the wheel such that the teeth of the three arms are visible.

Figure 23:
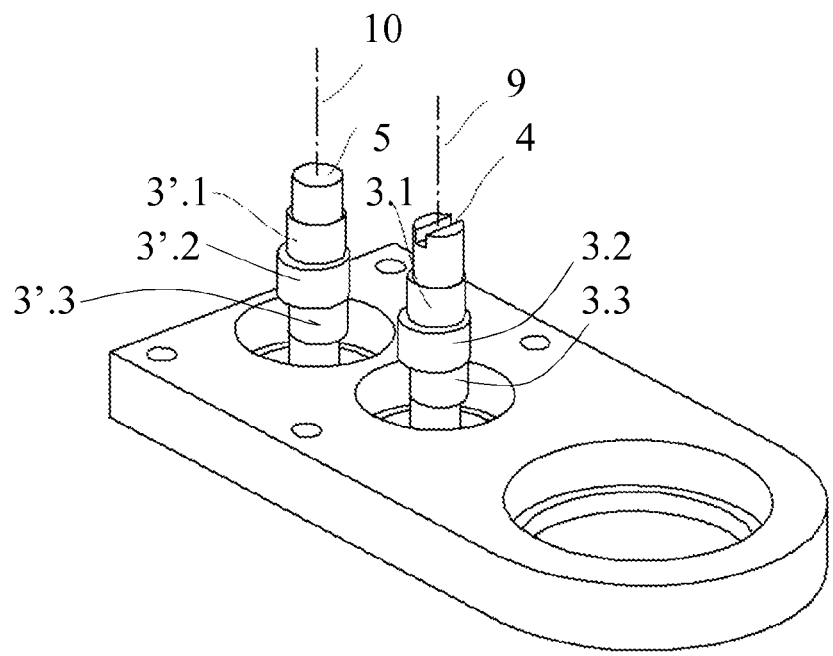

FIG. 23 repeats the embodiment of FIG. 21 by showing only the shafts 4 and 5 and their bearings to show the eccentricity of the bearings and their identical arrangement on the shafts 4 and 5.

Figure 24:
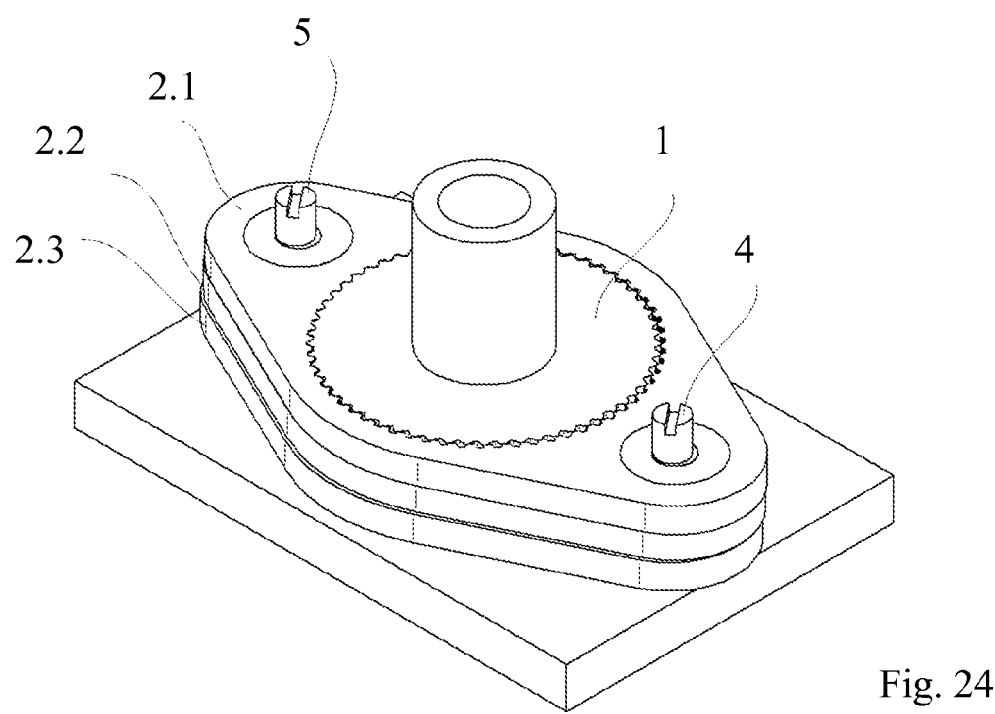

FIG. 24 shows an embodiment similar to that of FIG. 21 in the sense where the arms 2.1, 2.2, 2.3 have many teeth. In this case, the arms form a complete crown around the movable member. The two shafts 4 and 5 are arranged on either side of the movable member.

Figure 25:
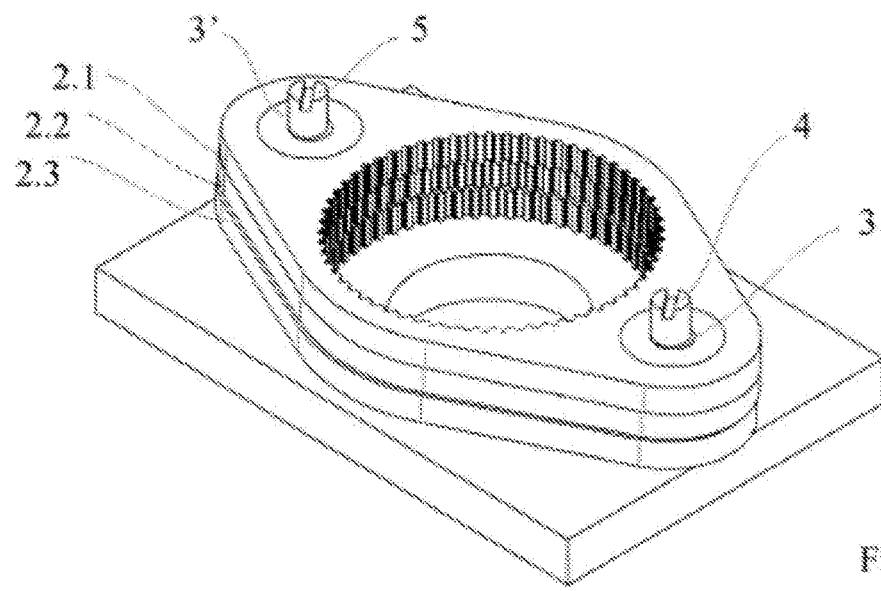

FIG. 25 repeats the embodiment of FIG. 24 by hiding the movable member to show the arrangement of the teeth on the arms.

Figure 26:
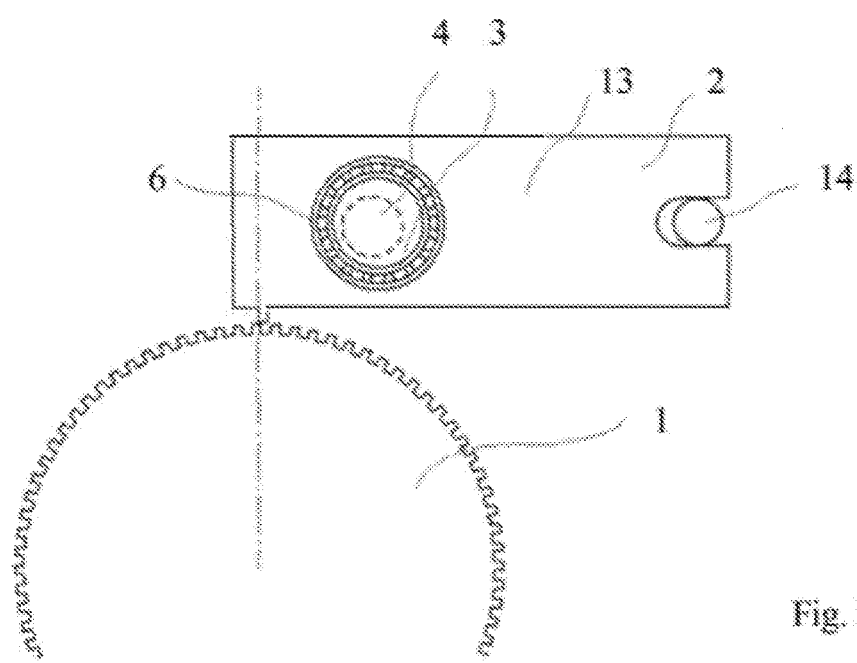

FIG. 26 illustrates another aspect of the invention where the teeth of the arms 2 are kept in a defined direction. The arms 2, articulated on a bearing of the shaft 4, present a groove which can slide on a dowel 14 fixed relative to the axes of the movable member 1 and of the shaft 4. A single arm is shown in FIG. 26 to clarify the diagram, but, as in the devices described in relation to the other figures, there are at least three arms superposed with one tooth each at a minimum so that there is still at least one tooth engaged in a notch of the wheel due to the angular offset of their respective bearing around the shaft 4.

Figure 1:
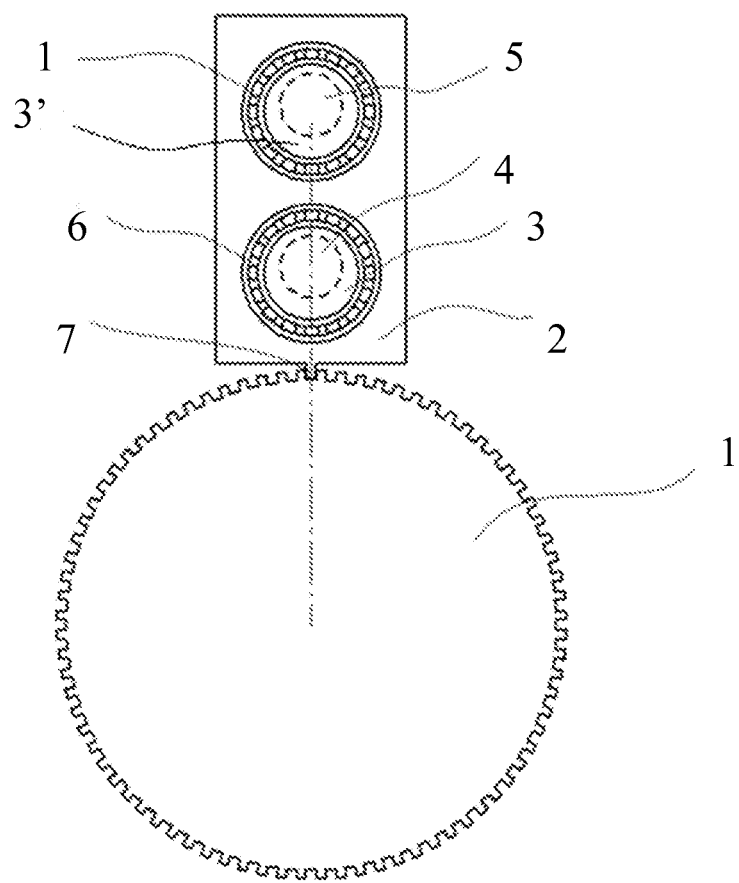
Figure 2:
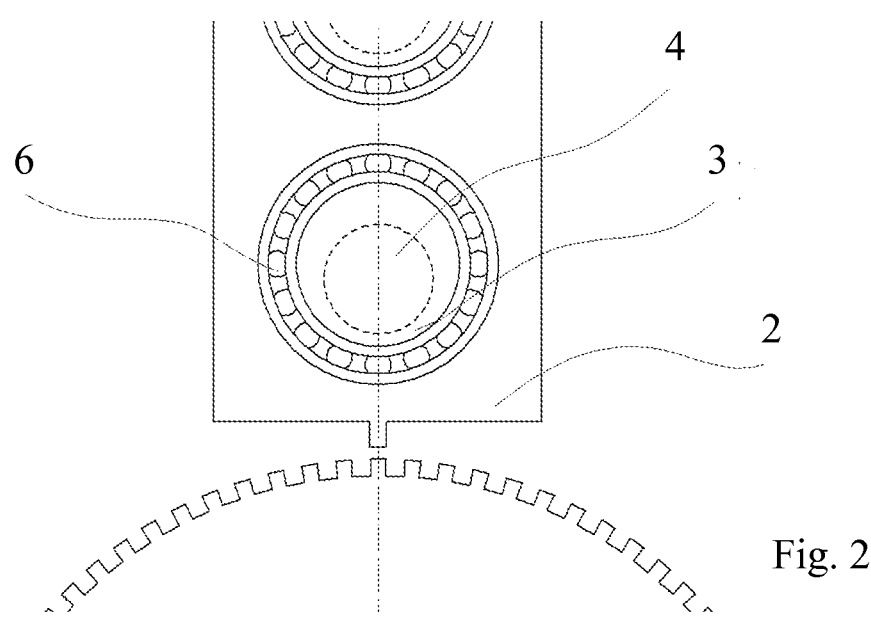
Figure 3:
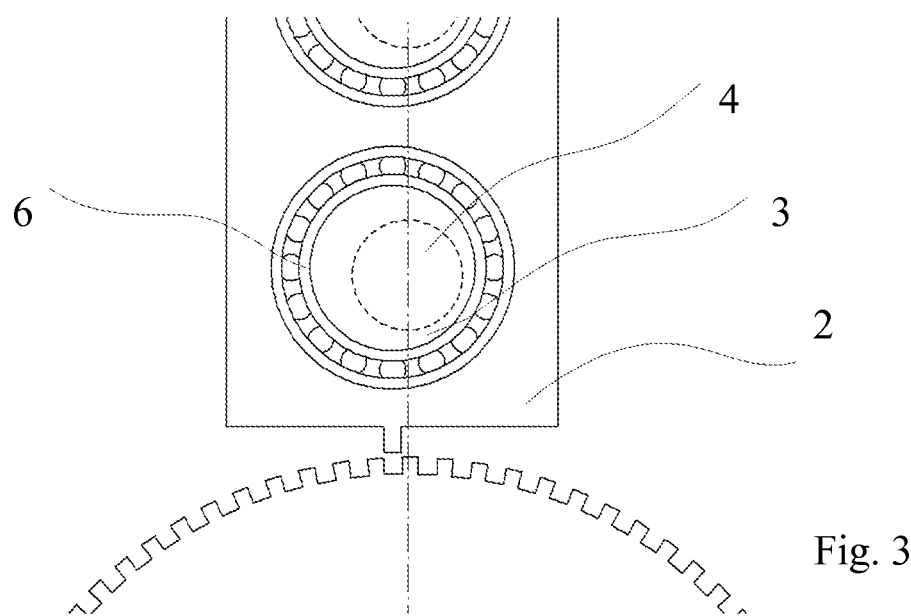
Figure 4:
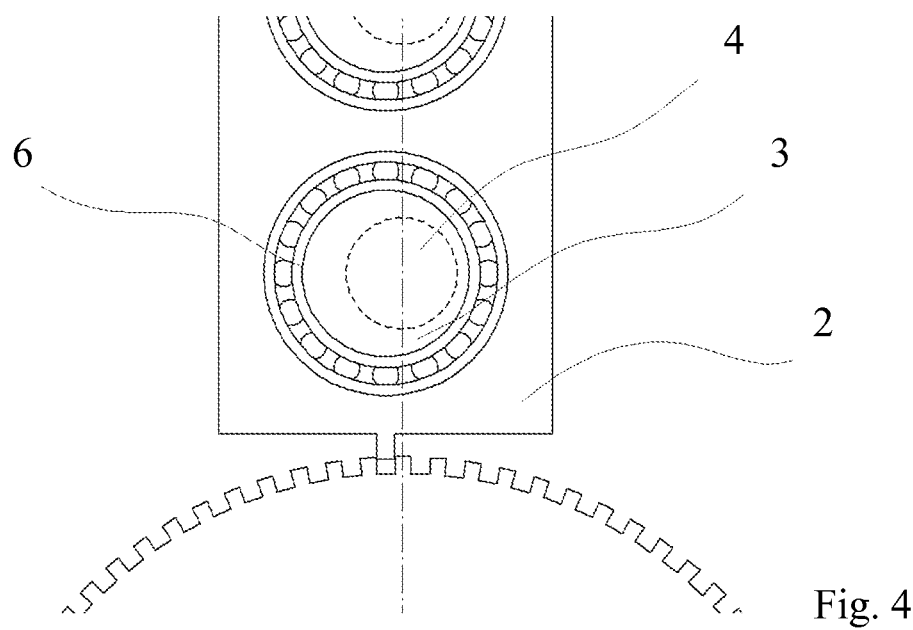
Figure 5:
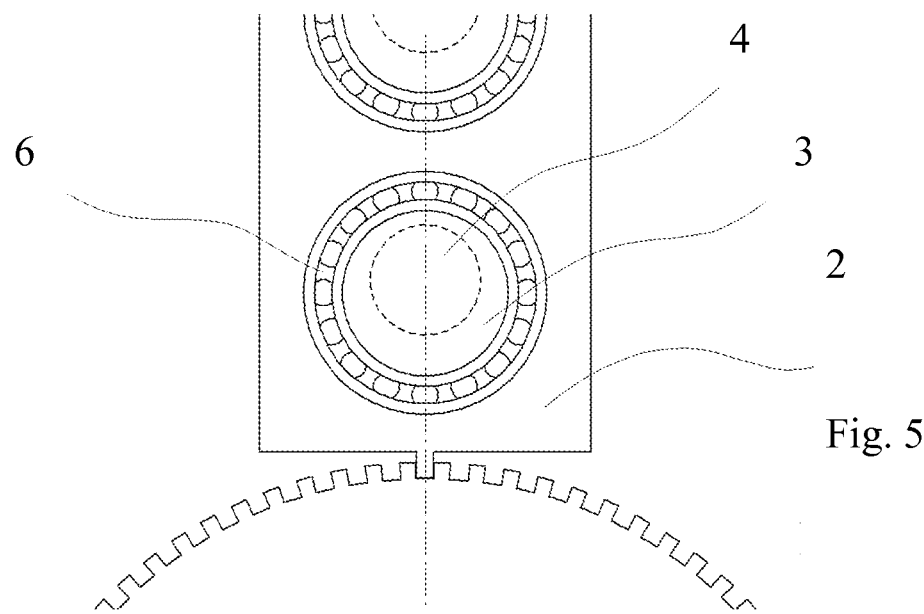

In reference to FIGS. 1 to 7, the basic principle of the invention will be explained in the case of a wheel having notches made on its external circumference, but which also applies for the case of a crown having notches made on its inner circumferential surface or even for the case of a rack. As shown in FIG. 1, the reducer comprises a wheel 1 fitted with an output shaft (not shown in FIGS. 1 to 7), a shaft 4 and an arm 2 for transmission of movement between the shaft 4 and the wheel 1. The wheel 1 comprises a series of notches in its external surface. The number of notches is a function of the desired reduction ratio, for example 80 notches for a ratio of 1/80. The arm 2 is mounted on a cylindrical bearing 3 of the shaft 4 preferably by means of a ball bearing 6 or a plain ring. The cylindrical bearing 3 has slight eccentricity relative to the axis of rotation of the shaft 4. The part 2 comprises a tooth 7 which engages in the notches of the wheel 1. The part 2 is mounted on a cylindrical bearing 3' of a secondary shaft 5, preferably also by means of a ball bearing 6 or a plain ring. The axis of rotation 10 of the secondary shaft 5 is parallel to the axis of rotation 9 of the shaft 4. This cylindrical bearing 3' of the secondary axis 5 has the same eccentricity as the cylindrical bearing 3. If the shaft 4 and the axis 5 rotate in synchronism, the part 2 will always be oriented in the same direction. In the case of FIG. 1, the part 2 will always be oriented in the vertical direction as well as the tooth 7 located at its base. When the shaft 4 rotates, any point of the part 2 describes a circular trajectory due to the eccentricity of the cylindrical bearing 3, the radius of the circular trajectory corresponding to the eccentricity distance from the cylindrical bearing 3 to the axis of rotation of the shaft 4.

The wheel 1 is mounted so as to be able to rotate around an axis 8 located at the center of the latter. When the shaft 4 describes a revolution, the tooth 7 of the part 2 will fit in a notch of the wheel 1 and drive the wheel in rotation over a peripheral distance which will be slightly less than the eccentricity diameter of the part 3 relative to the shaft 4. During rotation of the shaft 4, the tooth of the part 2 will disengage from the notch.

FIGS. 2 to 7 show the different positions of the tooth 7 relative to the notches of the wheel 1. When the cylindrical bearing 3 due its eccentricity is opposite the wheel 1, the tooth 7 is completely disengaged from the notches: cf. FIG. 2. Progressively, when the shaft 4 rotates, while it remains vertical, the tooth will approach the wheel and fit in a notch: cf. FIGS. 3 and 4. When the shaft 4 will have described rotation of 180° and the bearing 3 will be oriented towards the wheel 1, the tooth 7 will have entered the notch to the maximum: cf. FIG. 5. One may note at this time that rotation of the axis 4 will cause movement of the arm 2 over a circular trajectory but which will be tangential to a notional circle centered on the axis of rotation of the wheel 1 (this tangent being horizontal in the case of FIGS. 1 to 7). The circular movement of the tooth 7 and the circular movement of the notch of the wheel 1 will both be almost combined. The wheel 1 will be driven by the tooth 7 therefore with very little friction and therefore with a mechanical yield of almost 100%. It can also be noted that due to this transmission with little friction and the presence of ball bearings or other or a plain bearing at the shaft 4, if the shaft 4 is free in rotation and if torque is exerted on the wheel, the pressure force of the edge of the notch on the tooth 7 will initiate rotation of the shaft 4. This characteristic will enable reversibility of movement, i.e., the possibility of having the shaft 4 rotate by having the wheel 1 rotate. The rotation speed is then multiplied by the number of notches of the wheel 1.

Figure 6:
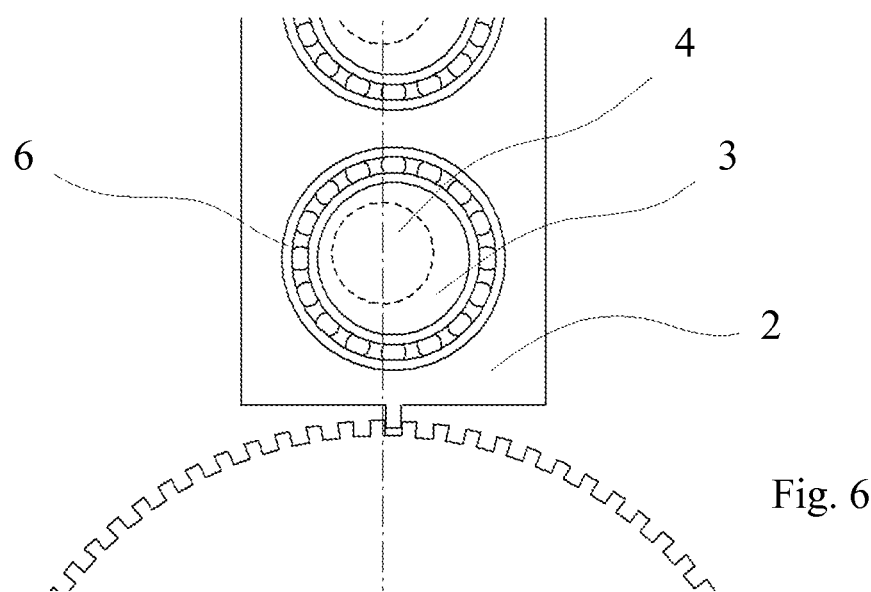
Figure 7:
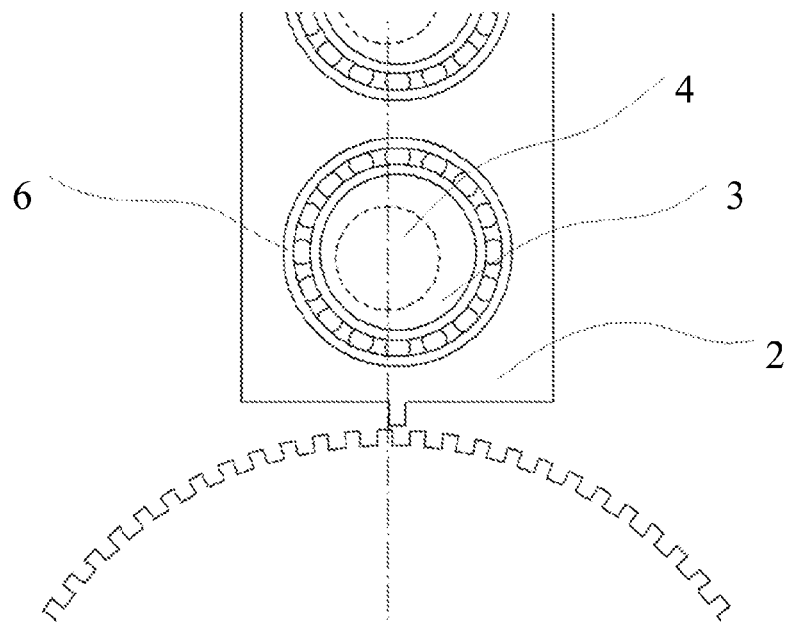

During rotation of the shaft 4, the tooth 7 will disengage from the notch: cf. FIGS. 6 and 7. In this case, the wheel 1 is now not driven by the arm 2 and could therefore rotate freely around its axis 8. To avoid this and for the wheel 1 to be always positioned precisely by at least one tooth engaged in one of its notches, it is advantageous to stack at least three wheels 1 having notches mounted on the same axis and assembled rigidly, and at least three arms 2 each comprising at least one tooth 7 and driven by the shaft 4, and to arrange them so that at any point of rotation of the shaft 4, there is at least one tooth 7 engaged in a notch of a wheel 1.

Figure 8:
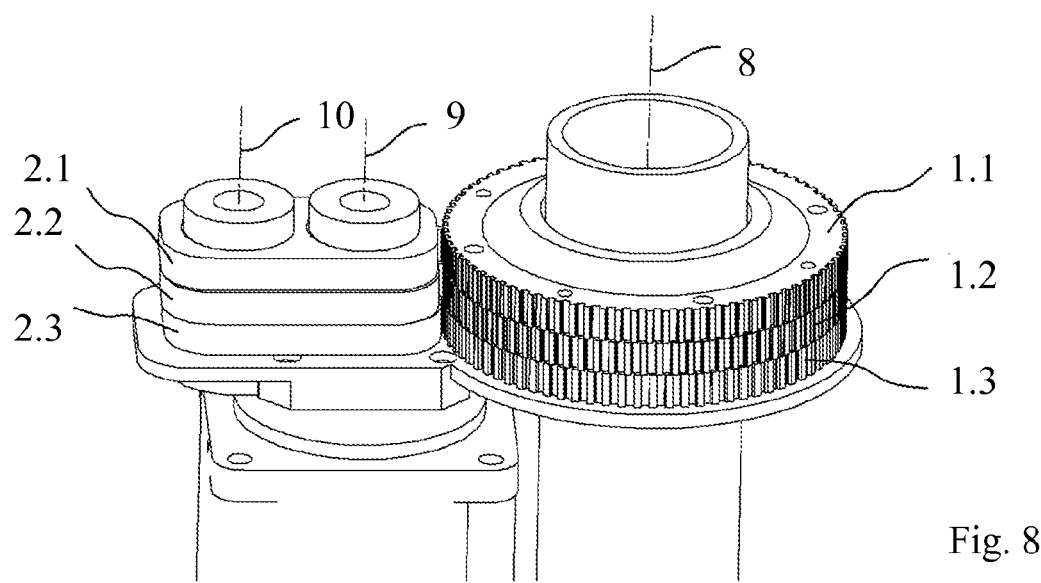
FIG. 8 represents an embodiment of the invention with three arms 2.1, 2.2, 2.3 (hereinbelow, these arms are also referenced interchangeably by the reference numeral 2) and a notched wheel, the positions of the notches on the periphery being offset on three levels corresponding to the positions of the three arms.

FIG. 8 shows such an arrangement. The wheel comprises three parts 1.1, 1.2, 1.3 which are fixedly assembled together. It is mounted so that it can rotate around its axis 8. The notches of the three parts 1.1, 1.2, 1.3 are offset. The arms 2.1, 2.2, 2.3 for transmission of movement between the shaft 4 and the wheel 1—i.e. three arms 2 described earlier—comprise each one tooth 7 and are each mounted on a respective eccentric bearing 3 of the shaft 4. These bearings 3 are offset angularly around the axis of rotation of the shaft 4 preferably uniformly. In this way, they are offset by around 120° in the case of a system with three teeth 7 and three wheels 1, by 90° in the case of a system with four teeth 7 and four wheels 1, etc. The value of the eccentricity to the axis of rotation of the shaft 4 is the same for the different bearings. The shaft 4 therefore has the shape of a crankshaft with at least three bearings 3.1, 3.2, 3.3 as is illustrated in FIG. 11. This is also the case of the secondary shaft 5 (this can be seen for another embodiment in FIG. 23 where the bearings of the shaft 5 are referenced 3'.1, 3'.2, 3'.3). During rotation of the shaft 4, each tooth will fit in a notch of the wheel corresponding to it. When a tooth disengages from its notch, another tooth of another part engages in the notch of the facing wheel. For example, with a system with three teeth whereof the trajectories are offset by 120°, it can be ensured that there will always be one tooth engaged in a notch of one of the wheels. And since at any time there will be a tooth engaged in a notch of the corresponding wheel, all three wheels will always be positioned in a determined manner. When the shaft will have described one revolution, all three wheels will have rotated by the value of one notch. In the case where the wheels each comprise 100 notches, for one revolution of the shaft 4 the wheel will have rotated by the value of one notch, i.e. 1/100th of a revolution. The device is understood as a rotation speed reducer with a reduction ratio of 1/100.

The fact that the arms 2.1, 2.2, 2.3 are mounted on crankshaft bearings offset by the same angle ensures that the shaft 4 and the secondary shaft 5 are connected mechanically and will rotate together in synchronism without an external device ensuring constant orientation of the arms 2. It is also possible to variously use one or the other of the two shafts as drive shaft, and the other as secondary shaft.

The value of the eccentricity of the crankshaft bearings on the shaft 4 and on the secondary axis 5 is calculated with precision so that the teeth are definitely facing a notch at the time when they contact with the wheel. Despite very low eccentricity, for example 0.6 mm for a reducer of ratio 1/100 with wheels with notches of diameter 100 mm, the fact that the mobile pieces are mounted with ball, roller or needle bearings or plain rings or bearings eliminates friction and enables reversibility. That means that if torque is exerted on the wheels 1, this will cause rotation of the shaft 4, as long as nothing opposes its movement.

It should be noted that the presence of at least three arms 2 mounted on the bearings 3 of the shaft 4 and also mounted on the bearings 3' of the secondary shaft 5, because the bearings present identical eccentricity on the two shafts, because these bearings are offset angularly relative to each other with angles of under 180°, because these angular offsets are identical on the shaft 4 and the secondary shaft 5, produces transmission movement between the shaft 4 and the secondary shaft 5.

Arrangements of pieces other than that of FIG. 8 are possible.

FIG. 9 illustrates an embodiment where the wheel 1 has a series of notches aligned from top to bottom. So that there is always at least one tooth engaged in a notch, the teeth 7 of the arms 2 are offset laterally as a function of the position of their bearings 3, as is shown in FIG. 10.

For the sake of clarity, FIGS. 12 and 13 illustrate only one wheel, a tooth and an arm which bears the tooth, but in fact there are at least three which are superposed.

In FIG. 12, the shaft 4 and the secondary shaft 5 are positioned equidistant from the wheel. The positions of the shafts 4 and 5 relative to the axis 8 of the wheel 1 have no influence on operation, and can be any.

In FIG. 13, the notches are inside a crown 11 which is hollow and the motor and secondary shafts are located inside said crown.

In all cases, the shaft and the secondary shaft rotate in synchronism to ensure constant orientation of the arms 2 which bear one or more teeth 7. And there are at least three pieces 2 superposed with at least three teeth and three wheels so that there is always one tooth engaged in a notch.

The fact that there is just one trimming operation and that it takes place on the outside of the wheels which is easily accessible makes production of this type of reducer easier and consequently cheaper.

Figure 15:
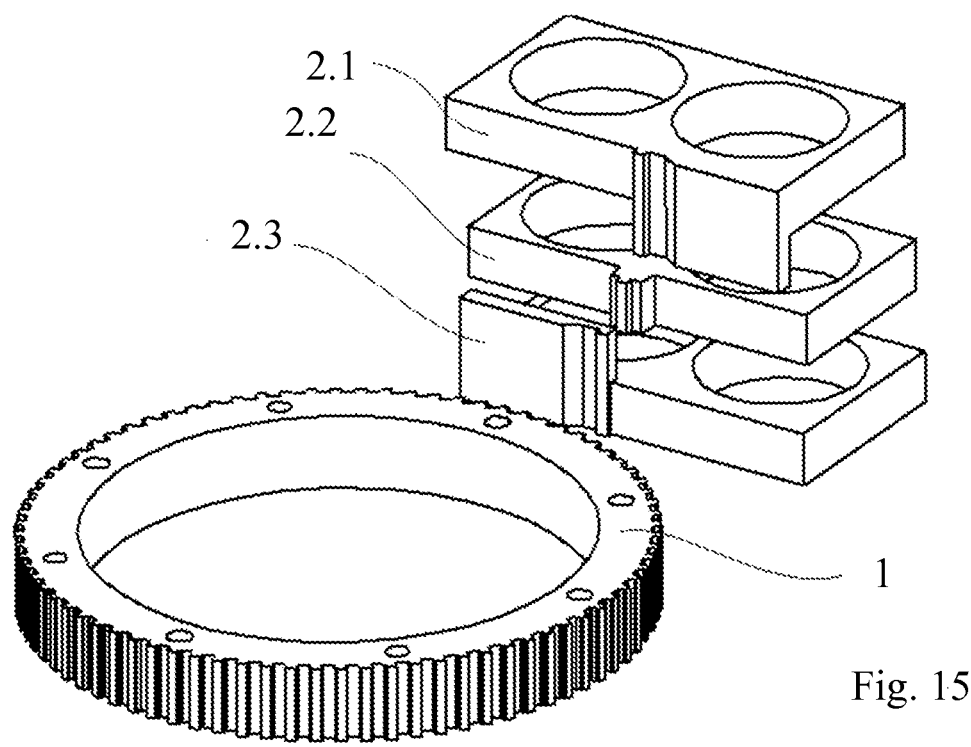
Figure 16:
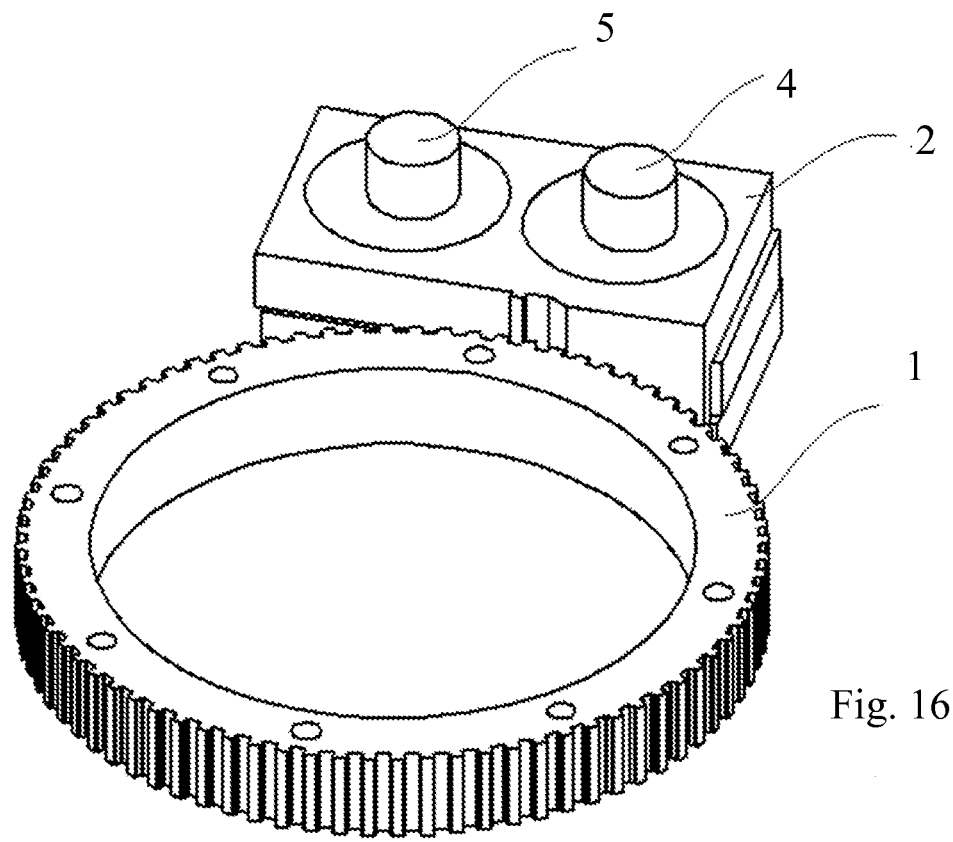
Figure 17:
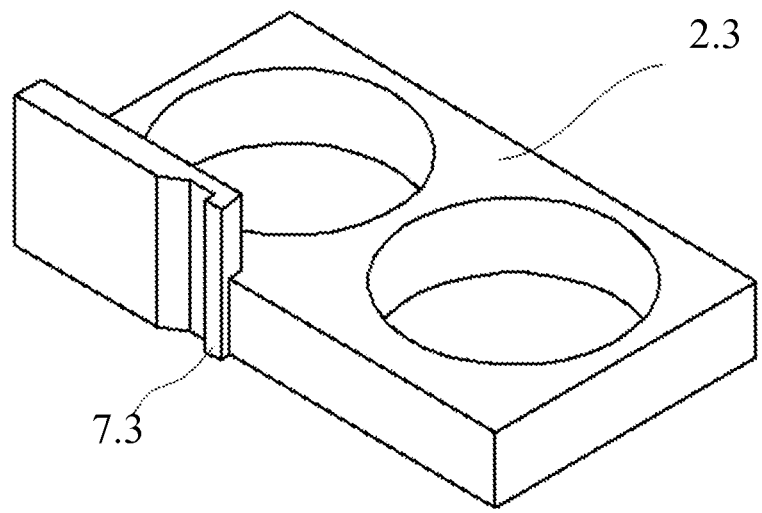
Figure 18:
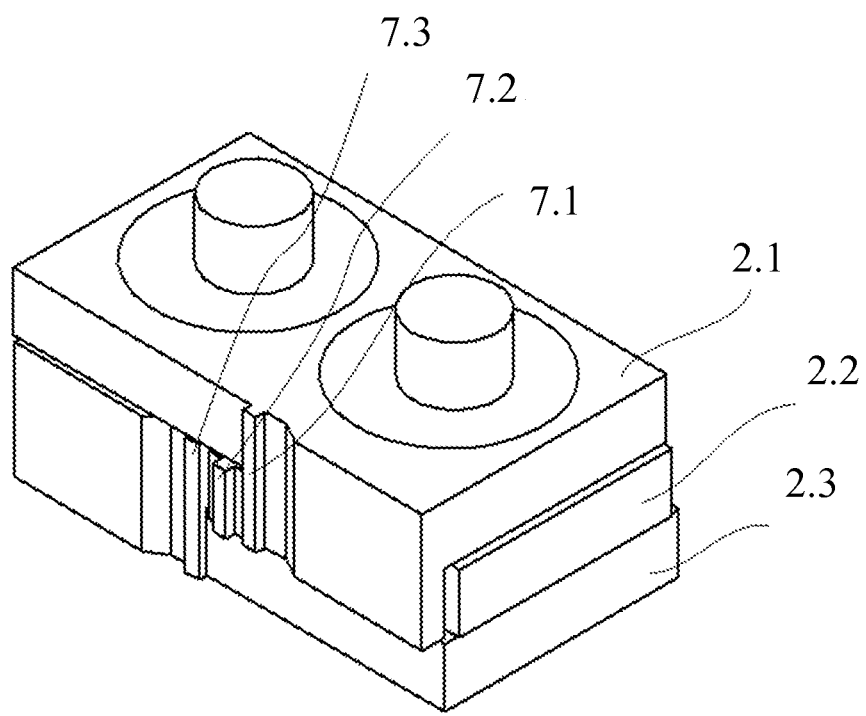

Another possibility for construction consists of using a finer wheel 1 and whereof the thickness is less than the total thickness of the arms 2 as in the embodiment illustrated by FIGS. 14 to 19. In this case, the teeth 7 of the three or more arms 2 fit in contiguous or adjacent notches of the wheel 1. FIG. 19 shows the arrangement of the teeth and of the wheel. FIG. 15 shows an exploded view, the parts not being in their place, but correctly oriented relative to each other. Each arm 2 comprises a tooth respectively referenced 7.1, 7.2, 7.3. FIG. 16 shows the same parts in their place in the reducer, their teeth interlocking so that the three teeth are facing the notches of the wheel. The operating principle stays the same. The arms 2 are always in rotation, guided by the bearings. The teeth of the three arms 2 enter the notches of the wheel so that one tooth at least is always engaged in a notch of the wheel. FIG. 17 shows one of the lateral arms 2, and the tooth protrudes upwards in this case. FIG. 18 shows the three arms 2 assembled, and in the central part, i.e., in the zone comprising the thickness of the part 2.2 in the middle, the three teeth are present. It is in this zone where the teeth will enter the notches of the wheel. FIG. 19 shows the three teeth facing three contiguous notches of the wheel. This construction with a finer wheel will be simpler to produce, and therefore less expensive. It will also be lighter.

More generally, the device presents the following preferred characteristics. The shaft 4 and the secondary shaft 5 have at least three bearings 3 with the same eccentricity, and the bearings are spaced apart, about the axes of rotation of their shafts, by angles of less than 180°, enabling transmission of rotation movement from shaft 4 to the secondary shaft 5. The shaft 4 and the secondary shaft 5 are kept in a determined position, in the same mechanical assembly, by ball, roller or needle bearings, or plain rings or bearings, so that their axes are parallel and they can rotate around their axis, the shaft 4 is connected to a mechanical power source and the secondary shaft 5 is connected only to the shaft 4 by the arms 2. The speed reducer comprises at least three arms 2 whereof the shape of the teeth, in relief, corresponds to the shape of the notches, hollow, of the movable member. The speed reducer comprises at least three arms 2 whereof the teeth 7 can engage in notches of a movable member 1, whereof the angular offset of the bearings of the shaft 4 and of the secondary shaft 5 imply that for any angle of rotation of the shaft 4 there is at least one tooth of an arm 2 engaged in a notch of the movable member 1. As per another embodiment, the wheel 1 is replaced by a rack as illustrated in FIG. 20. In this case, rotary movement of the shaft 4 is transformed into linear movement of the rack. When the shaft 4 completes a revolution, the relative position of the motor with respect to the rack will be displaced by the value of the distance between two notches of the rack.

According to another embodiment illustrated by FIGS. 21 to 23, the arms—cf. references 2.1, 2.2, 2.3—can comprise many teeth which correspond to the notches of the wheel 1. As for the preceding embodiments, the teeth of the arms engage progressively in the notches of the wheel and ensure continuity in the positioning of the wheel. The position of the teeth on the arms is such that they are disposed circularly, which would correspond to a part of a crown which would have a diameter—preferably identical for each arm—slightly greater than the diameter of the movable member. For example, if the movable member, here a wheel, has 60 notches on its periphery, then the teeth of the arms would form a portion of a crown having 61 teeth arranged over a diameter slightly greater than that of the wheel, in a ratio of 61 divided by 60. In this case, the device will have a reduction ratio of 1/60. When the drive shaft describes a revolution, this causes offset and the same tooth will not reengage in the same notch of the wheel, but in another notch offset by one or more notches relative to the original one. The direction of offset is linked to the direction of rotation of the shafts 4 and 5. FIG. 21 represents the three arms 2.1, 2.2, 2.3 mounted on the shafts 4 and 5 and whereof the multiple teeth are, in some positions, engaged in the notches of the wheel 1. FIG. 22 represents the three arms 2.1, 2.2, 2.3 mounted on the shafts 4 and 5, but here the wheel is not illustrated so as to reveal the plurality of teeth on the arms. FIG. 23 represents the shafts 4 and 5 without the wheel 1 and the arm 2 to show the eccentricity of the bearings 3.1, 3.2, 3.3 of the shaft 4 and the bearings 3'.1, 3'.2, 3'.3 and their identical arrangement on the shafts 4 and 5. The operation of the teeth, in this embodiment, is similar to that of a reduction gear comprising a complete crown with an internal toothing and meshing with a wheel having a slightly smaller number of teeth. In this case, the most adapted shape of the teeth is similar to that of the gears as involutes of a circle, whereas when the arms have a single tooth, their shape is preferably square. The advantages of this embodiment with many teeth are:

better progressivity of the transmission of force since several teeth are in contact with their corresponding notches at the same moment;

limitation of friction, since at any time there is one tooth completely engaged in its notch and at this moment their trajectories are tangential;

homokinetic transmission whereas in the case of a reducer with one tooth there is a slight difference in transmission ratio between the motor when a tooth makes contact with its notch and the moment when it is completely engaged, because the trajectory of the tooth and that of the notch are not tangential at the moment of their contact, while their trajectories are tangential when the tooth is fully engaged in the notch;

relative to a cycloid reducer, the latter described hereinabove makes it possible to use a hollow output shaft of large diameter, which makes it possible to channel cables and tubes which will be subject to fewer movements during rotation of the output shaft of the reducer than if they were placed away from the axis of rotation;

in this embodiment, the machining operation of the teeth of the arms is made easier because access to bulky tools such as grinding wheels is possible over a portion of the crown, though not for a complete crown.

It is also possible to increase the number of teeth of the arms to make a complete crown. This embodiment is illustrated by FIGS. 24 and 25. The most advantageous arrangement then consists of placing the shafts 4 and 5 away from each other on each side of the wheel 1. The considerable distance between the shafts will ensue proper stability. In this embodiment, the arms 2.1, 2.2, 2.3 are always meshed with the wheel 1. This embodiment brings the same advantages as the embodiment of FIG. 21, but in an even more pronounced way:

very good progressivity;

very good resistance to wear since teeth of each arm are engaged permanently;

homokinetic transmission;

large-diameter hollow axis;

the drive shaft and the secondary shaft are distant from the axis of the output shaft and it is possible to support them via bearings at their two ends, which improves their rigidity. This is not possible for reducers of cycloid type whereof the external crown is in the shape of a bell.

Devices with one or two arms mounted on shafts with eccentric bearings are known. For example, FR 2,833,673 A1 discloses a device where there is only one crown mounted on two eccentrics and whereof the movement in synchronism is ensured by three toothed wheels. The use of toothed wheels which have by way of construction clearance necessary for their operation results in the fact that the reducer in its entirety has relatively substantial clearance. The advantage of the present invention stems from the use of three arms or more and bearings offset by fewer than 180° ensuring the identity of movement between the two shafts without an additional device such as toothed wheels or transmissions by wheels and belts, and which have excellent precision due to the operating clearance being very low since this clearance can originate from rollers or bearings only.

In another embodiment which is inverse relative to that of FIGS. 24 and 25, the arms each consist of a toothed wheel having teeth distributed over their entire external circumference to engage the notches of a movable member made in the shape of a crown inside which the notches are distributed circumferentially. Each of the wheels is therefore mounted on a first eccentric bearing of the shaft 4 and a second eccentric bearing of the shaft 5 to remain parallel to itself irrespective of the angle of rotation of the shafts 4, 5.

In general, it is evident that those embodiments not relying on a toothed crown both for the arms as for the movable member, which can be in the shape of a toothed wheel or rack, enable easy manufacturing. The ease of manufacturing is greater in the event where the arms 2 each have a single tooth 7 only or a limited number of teeth 7.

Of course, the present invention is not limited to the examples and embodiment as described and represented, but it can have many variants accessible to those skilled in the art.

According to another aspect, the invention also proposes a movement transmission device, comprising:
a shaft mounted for rotation about its longitudinal axis,
a movable member having a succession of notches,
a plurality of arms for transmitting together movement between the shaft and the movable member,
wherein:
each arm is provided with at least one tooth for cooperating with the notches of the movable member,
each arm is articulated on a bearing eccentric to an axis about which the bearing is rotatably mounted, the bearing and the shaft being linked to rotate in synchronism,
the movable member and each arm are guided mechanically so that the arm describes a cyclic movement for each revolution of the eccentric bearing on which it is articulated, the cyclic movement successively comprising:
a phase during which certain teeth of the arm are free of engagement with the movable member, and
a phase during which these same teeth of the arm are in engagement with the movable member by engagement of the at least one tooth of the arm with a notch of the movable member so that displacement of the one causes the displacement of the other, wherein the eccentric hearings are offset angularly about their axis relative to each other so that there is at least one arm engaged with the movable member whatever the angle of rotation of the shaft and wherein each arm presents an element serving to mechanically guide the arm jointly with the bearing on which the arm is mounted throughout the cyclic movement.

The angular offset of the eccentric bearings and use of the same element of the arm serving to guide it mechanically throughout the cyclic movement jointly with the bearing on which it is mounted has several advantages. It simplifies especially the movement transmission member between the shaft and the movable member by not requiring three radial arms as is the case in EP155497. Also, the movable member can be other than a crown with internal toothing as is the case in U.S. Pat. No. 5,351,568, DE 312164 and EP155497.

According to preferred embodiments, the invention following this aspect further comprises the following characteristics:
each arm is guided mechanically by a dowel sliding in a slot or a groove throughout the cyclic movement;
the eccentric bearings are arranged on the shaft;
the angular offset between any two successive bearings is less than 180°;
the bearings are angularly offset with respect to one another in a regular manner about their axis of rotation;
the at least one tooth of the arms cooperate with a same succession of notches;
the movable member has several successions of notches disposed side by side, the notches of each being offset from the notches of the others and the at least one tooth of each arm cooperating with another of the successions of notches;
the arms are mounted on the bearings by ball or needle bearings or plain rings;
the movable member is a rack guided in translation;
the movable member is a wheel rotatably mounted about its central axis and on which the notches are disposed circumferentially;
the movable member is a crown mounted for rotation about its central axis and inside which the notches are disposed circumferentially;
the device forms a speed reducer whose shaft is the input and whose reduction ratio is preferably at least 1/50.

The device of the invention according to this aspect can also advantageously be used for transmitting the rotary movement of a motor to a joint of a robot arm or for moving an element of a machine from the rotary movement of a motor.

The invention claimed is:

1. A movement transmission method, in which a movement transmission device is used for transmitting the movement, the movement transmission device comprising:
a first shaft rotatably mounted about its longitudinal axis,
a movable member having at least one succession of notches, the movable member being:
either a wheel rotatably mounted about its central axis and on which the notches are disposed circumferentially, or
a crown rotatably mounted about its central axis and inside which the notches are disposed circumferentially,
at least three arms for transmitting together movement between the first shaft and the movable member,
wherein:
each arm is provided with at least one tooth for cooperating with the notches of the movable member,
each arm is articulated on a first bearing eccentric to a first axis about which the bearing is rotatably mounted, the first bearing and the first shaft being linked to rotate in synchronism;
the movable member and each arm are guided mechanically so that:
the arm describes a cyclic movement for each revolution of the first bearing on which it is articulated, and
the arm is in engagement with the mobile member for at least a part of the cyclic movement by engaging the at least one tooth of the arm with a notch of the movable member so that displacement of the one causes the displacement of the other,
the first bearings are arranged so that there is at least one arm engaged with the movable member whatever the angle of rotation of the first shaft,
each arm is also articulated on a second bearing eccentric to a second axis about which the second bearing is rotatably mounted to maintain the arm parallel to itself regardless of the angle of rotation of the first shaft, and
the first bearings are arranged on the first shaft and the second bearings are arranged on a same second shaft,
wherein the method comprises using only one of the first and second shafts of the movement transmission device as a drive shaft, the other of the first and second shafts being used as a secondary shaft to which the arms transmit a rotation movement of the drive shaft.

2. The movement transmission method according to claim 1, comprising connecting the drive shaft to a mechanical power source for rotating the drive shaft, the movable member being used for outputting a rotation movement from the movement transmission device.

3. The movement transmission method according to claim 1, wherein the first bearings, respectively the second bearings, of the movement transmission device are angularly offset relative to each other about their respective axis of rotation, the angular offset between any two successive first bearings, respectively two successive second bearings, is less than 180°.

4. The movement transmission method according to claim 1, wherein the at least one tooth of the arms of the movement transmission device cooperate with a same succession of notches.

5. The movement transmission method according to claim 1, wherein the movable member of the movement transmission device has several successions of notches disposed side by side, the notches of each succession of notches being offset from the notches of the other successions of notches and the at least one tooth of each arm cooperating with another of the successions of notches.

6. The movement transmission method according to claim 1, wherein the arms of the movement transmission device are mounted on the first bearings and on the second bearings by ball, roller or needle bearings or plain rings or bearings.

7. The movement transmission method according to claim 6, wherein the movement transmission device is reversible so that a torque exerted on the movable member causes rotation of the first and second shafts.

8. The movement transmission method according to claim 1, wherein the movement transmission device forms a speed reducer with respect to one of the first and seconds shaft being the input and whose reduction ratio is at least 1/50.

9. A movement transmission method, in which a movement transmission device is used for transmitting the movement, the movement transmission device comprising:
a first shaft rotatably mounted about its longitudinal axis,
a wheel rotatably mounted about its central axis and on which at least one succession of notches is disposed circumferentially,
at least three arms for transmitting together movement between the first shaft and the wheel,
wherein:
each arm is provided with a plurality of teeth for cooperating with the notches of the wheel, the plurality of teeth being arranged on a circular portion so as to form a ring gear portion,
each arm is articulated on a first bearing eccentric to a first axis about which the bearing is rotatably mounted, the first bearing and the first shaft being linked to rotate in synchronism;
the wheel and each arm are guided mechanically so that:
the arm describes a cyclic movement for each revolution of the first bearing on which it is articulated, and
the arm is in engagement with the wheel for at least a part of the cyclic movement through cooperation of the teeth of the arm with notches of the wheel so that displacement of the one causes the displacement of the other,
the first bearings are arranged so that there is at least one arm engaged with the wheel whatever the angle of rotation of the first shaft,
each arm is also articulated on a second bearing eccentric to a second axis about which the second bearing is rotatably mounted to maintain the arm parallel to itself regardless of the angle of rotation of the first shaft, and
the first bearings are arranged on the first shaft and the second bearings are arranged on a same second shaft,
wherein the method comprises using only one of the first and second shafts of the movement transmission device as a drive shaft, the other of the first and second shafts being used as a secondary shaft to which the arms transmit a rotation movement of the drive shaft.

10. The movement transmission method according to claim 9, comprising connecting the drive shaft to a mechanical power source for rotating the drive shaft, the wheel being used for outputting a rotation movement from the movement transmission device.

11. The movement transmission method according to claim 9, wherein the first bearings, respectively the second bearings, of the movement transmission device are angularly offset relative to each other about their respective axis of rotation, the angular offset between any two successive first bearings, respectively two successive second bearings, is less than 180°.

12. The movement transmission method according to claim 9, wherein the movement transmission device is reversible so that a torque exerted on the movable member causes rotation of the first and second shafts.

13. The movement transmission method according to claim 12, wherein the arms of the movement transmission device are mounted on the first bearings and on the second bearings by ball, roller or needle bearings or plain rings or bearings.

14. The movement transmission method according to claim 9, wherein the movement transmission device forms a speed reducer with respect to one of the first and seconds shaft being the input and whose reduction ratio is at least 1/50.

15. A movement transmission method, in which a movement transmission device is used for transmitting the movement, the movement transmission device comprising:
a first shaft rotatably mounted about its longitudinal axis,
a wheel rotatably mounted about its central axis and on which at least one succession of notches is disposed circumferentially,
at least three arms for transmitting together movement between the first shaft and the wheel,
wherein:
each arm comprises a ring gear inside which teeth are distributed over its entire circumference for cooperation with the notches of the wheel,
each arm is articulated on a first bearing eccentric to a first axis about which the bearing is rotatably mounted, the first bearing and the first shaft being linked to rotate in synchronism;
the wheel and each arm are guided mechanically so that:
the arm describes a cyclic movement for each revolution of the first bearing on which it is articulated, and
the arm is in engagement with the wheel during the cyclic movement through cooperation of the teeth of the arm with notches of the wheel so that displacement of the one causes the displacement of the other, each tooth being successively engaged in and then disengaged from a notch of the movable member during the cyclic movement of the arm,
each arm is also articulated on a second bearing eccentric to a second axis about which the second bearing is rotatably mounted to maintain the arm parallel to itself regardless of the angle of rotation of the first shaft, and the first bearings are arranged on the first shaft and the second bearings are arranged on a same second shaft, wherein the method comprises using only one of the first and second shafts of the movement transmission device as a drive shaft, the other of the first and second shafts being used as a secondary shaft to which the arms transmit a rotation movement of the drive shaft.

16. The movement transmission method according to claim 15, comprising connecting the drive shaft to a mechanical power source for rotating the drive shaft, the wheel being used for outputting a rotation movement from the movement transmission device.

17. The movement transmission method according to claim 15, wherein the first bearings, respectively the second bearings, of the movement transmission device are angularly offset relative to each other about their respective axis of rotation, the angular offset between any two successive first bearings, respectively two successive second bearings, is less than 180°.

18. The movement transmission method according to claim 15, wherein the movement transmission device is reversible so that a torque exerted on the movable member causes rotation of the first and second shafts.

19. The movement transmission method according to claim 18, wherein the arms of the movement transmission device are mounted on the first bearings and on the second bearings by ball, roller or needle bearings or plain rings or bearings.

20. The movement transmission method according to claim 15, wherein the movement transmission device forms a speed reducer with respect to one of the first and seconds shaft being the input and whose reduction ratio is at least 1/50.

* * * * *